(12) United States Patent
Næsje et al.

(10) Patent No.: US 11,949,236 B2
(45) Date of Patent: Apr. 2, 2024

(54) CHARGING STATION AND ARRANGEMENT OF ELECTRIC COMPONENTS FOR CONTROLLING THE DELIVERY OF ELECTRICITY FROM AN ELECTRICAL GRID TO AN ELECTRIC VEHICLE

(71) Applicant: Easee AS, Sandnes (NO)

(72) Inventors: Kjetil Næsje, Sandnes (NO); Jonas Helmikstøl, Hafrsfjord (NO); Steffen Mølgaard, Stavanger (NO); Ola Stengel, Stavanger (NO)

(73) Assignee: Easee AS, Sandnes (NO)

( * ) Notice: Subject to any disclaimer, the term of this patent is extended or adjusted under 35 U.S.C. 154(b) by 456 days.

(21) Appl. No.: 17/428,838

(22) PCT Filed: Feb. 5, 2020

(86) PCT No.: PCT/NO2020/050028
§ 371 (c)(1),
(2) Date: Aug. 5, 2021

(87) PCT Pub. No.: WO2020/167132
PCT Pub. Date: Aug. 20, 2020

(65) Prior Publication Data
US 2022/0131380 A1    Apr. 28, 2022

(30) Foreign Application Priority Data
Feb. 11, 2019  (NO) .................................... 20190184

(51) Int. Cl.
*H01M 10/46*      (2006.01)
*B60L 3/00*        (2019.01)
(Continued)

(52) U.S. Cl.
CPC .............. *H02J 3/26* (2013.01); *B60L 3/0046* (2013.01); *B60L 53/14* (2019.02); *B60L 53/63* (2019.02);
(Continued)

(58) Field of Classification Search
CPC ........ H02J 7/0013; H02J 2310/48; H02J 3/26; B60L 53/14; B60L 3/0046; B60L 53/63; B60L 3/04
(Continued)

(56) References Cited

U.S. PATENT DOCUMENTS

2004/0027003 A1 *  2/2004  Yang ......................... H02J 3/14
                                                            307/39
2009/0189456 A1    7/2009  Skutt
(Continued)

FOREIGN PATENT DOCUMENTS

DE    102013204256 A1 *  9/2014  .......... B60L 11/1809
DE    102017100138        7/2018
(Continued)

OTHER PUBLICATIONS

Norwegian Search Report for 20190184, dated Nov. 9, 2019.
(Continued)

*Primary Examiner* — Edward Tso
(74) *Attorney, Agent, or Firm* — Andrus Intellectual Property Law, LLP

(57) ABSTRACT

Electric components for controlling the delivery of electricity from an electrical grid to an electric vehicle, the arrangement having a first, a second, a third, and a fourth input terminals, each for receiving an electric signal from the electrical grid. The arrangement also includes two switching components for controlling two connections between a neutral output terminal connectable to the electric vehicle and the first and the second input terminals. Moreover, the
(Continued)

arrangement includes three switching components for controlling three connections between a first-phase output terminal connectable to the electric vehicle and the second, the third, and the fourth input terminals.

15 Claims, 8 Drawing Sheets

(51) Int. Cl.
*B60L 53/14* (2019.01)
*B60L 53/63* (2019.01)
*H02J 3/26* (2006.01)
*H02J 7/00* (2006.01)

(52) U.S. Cl.
CPC ......... *H02J 7/0013* (2013.01); *H02J 2310/48* (2020.01)

(58) Field of Classification Search
USPC ........................................ 320/104, 107, 109
See application file for complete search history.

(56) References Cited

U.S. PATENT DOCUMENTS

2016/0105024 A1   4/2016   Guillemin
2018/0043786 A1   2/2018   Corbeil et al.
2022/0410757 A1*  12/2022  Gottlieb .................. B60L 53/67

FOREIGN PATENT DOCUMENTS

| | | | |
|---|---|---|---|
| DE | 102017100138 A1 * | 7/2018 | ............. B60L 53/14 |
| EP | 3184352 | 6/2017 | |
| JP | 2019502349 | 1/2019 | |
| KR | 20160013083 | 2/2016 | |
| WO | 2017109094 | 6/2017 | |
| WO | 2018127307 | 7/2018 | |
| WO | 2019008218 | 1/2019 | |

OTHER PUBLICATIONS

International Search Report and the Written Opinion for PCT/NO2020/050028, dated Apr. 17, 2020.
Response to the Written Opinion for PCT/NO2020/050028, dated Sep. 7, 2020.
The Second Written Opinion for PCT/NO2020/050028, dated Mar. 12, 2021.
The International Preliminary Report on Patentability for PCT/NO2020/050028, dated Apr. 27, 2021.

* cited by examiner

CHARGING STATION AND ARRANGEMENT OF ELECTRIC COMPONENTS FOR CONTROLLING THE DELIVERY OF ELECTRICITY FROM AN ELECTRICAL GRID TO AN ELECTRIC VEHICLE

CROSS-REFERENCE TO RELATED APPLICATIONS

This application is the U.S. national stage application of International Application PCT/NO2020/050028, filed Feb. 5, 2020, which international application was published on Aug. 20, 2020, as International Publication WO 2020/167132 in the English language. The International Application claims priority of Norwegian Patent Application No. 20190184, filed Feb. 11, 2019. The international application and Norwegian application are both incorporated herein by reference, in entirety.

FIELD OF THE INVENTION

The present invention relates to an arrangement of electric components for controlling the delivery of electricity from an electrical grid to an electric vehicle, and it also relates to a charging station including such an arrangement.

BACKGROUND OF THE INVENTION

An electrical installation for recharging electric vehicles is typically organised in a tree structure in which a combination of electric signals (e.g. ground, protective earth, and first phase) from an electrical grid is distributed to a number of charging stations. The electrical installation is usually provided with: a main electrical safety device, such as a fuse, for interrupting the installation's supply of electricity if a predefined maximum current is consumed; an arrangement of the charging stations into groups; and an electrical safety device for each group in order to interrupt a group's supply of electricity if a predefined maximum current is consumed by the group. The electric signals from the electrical grid are distributed from the global electrical safety device to each of the electrical safety devices of the groups, and then to each of the charging stations within each group.

Around the world, a number of different combinations of electric signals are seen to be supplied to charging stations. In some cases, different types of earthing system are observed. For example, following the terminology established by the international standard IEC 60364, three families of earthing systems can be observed: Terra-Neutral (TN); Terra-Terra (TT), and Isolated-Terra (IT). In other cases, different types of electric power distribution are used, such as the split-phase type. Yet in other cases, different numbers of electrical phases can be observed. For example, a charging station can have one, two or three electrical phases available at its input terminals, and electric power from any of these can be transmitted to an electric vehicle.

Particularly, when more than one electrical phase is available to the charging stations in a group, an inefficient situation can happen due to phase balancing issues. For example, an inefficient situation can be observed when, in a group of charging stations protected by an electrical safety device for interrupting a three-phase power supply of the group at 32 A in any of the phases, two charging stations are each consuming 16 A from the same electrical phase. Alternatively, both charging stations can consume 32 A each but from different electrical phases, without causing the electrical safety device to interrupt the supply of electricity. This selection of phases allows doubling the amount of power that is used for recharging electric vehicles.

A known approach for improving the phase balance in a group of charging stations is to provide the charging stations with a feature for dynamically selecting the electrical phases being used to recharge an electric vehicle. For example, a charging station having three electrical phases as input can be operated to: in some cases, select one of the three phases and transmit it to the electric vehicle; in others, select the three phases and transmit them directly; or, yet in others, select any combination of two of the input phases and transmit them to the electric vehicle. A control system can be used for monitoring the load distribution (i.e. the electric vehicles that are being recharged over time) and issue commands to the charging stations indicating which electrical phases are to be used by each and the maximum power that an electric vehicle may consume from the indicated phases. Thus, the group of charging stations can better adapt to changes in the load distribution and consume power more efficiently than when each charging station is permanently connected to at least one electrical phase of the group. Patent application publication WO 2018/127307 A1 discloses such phase balancing solution.

A phase selection feature that is known to operate correctly with one combination of input electrical signals may not be suitable for another combination. The possible combinations of input electrical signals can differ in other ways than the number of electrical phases, as explained above. For example, the two input terminals that are supplied with the third electrical phase are typically different in the earthing systems of the TN and IT types. This difference can result in the wrong phase being transmitted to the electric vehicle, which in turn can result in safety risks, cause damage, or create phase balancing problems. Thus, the safe operability of a phase selection feature is strongly influenced by the combination of input electrical signals. The phase balancing technology disclosed in earlier-mentioned patent application publication WO 2018/127307 A1 only works for TN networks for example.

It can be challenging to provide a charging station for electric vehicles that allows phase selection, without knowing in advance which combination of input electrical signals will be available to the charging station. This challenge can be observed in a number of situations.

For example, when an electrician is hired to replace a charging station in an electrical installation, it is often only possible for him/her to know which combination of input electric signals will be available for the charging station when he/she is present at the site of the electrical installation. Thus, before travelling to the site, the electrician doesn't know which input signals will be available, and thus doesn't know which type of charging station to purchase or take to the site.

Another example of this challenge happens when an owner of an electrical installation wishes to buy a charging station. Typically, the owner doesn't have sufficient technical expertise to find out or understand which combination of input signals is available in the electrical installation. Thus, the owner can find him/herself in a situation in which several charging stations have to be bought until one works correctly. In an even worst context, the owner can buy the wrong charging station and cause damage to an electric vehicle.

Yet another example of this challenge is observed when a manufacturer of charging stations has to decide which type of charging stations with a phase selection feature is to be manufactured. In this context, it can be difficult to predict which type of charging stations will be sold in the future. In some countries there are different earthing systems being used, and this does not always make it easy to decide based on the intended region of sale. The manufacturer can easily run into a situation where he has decided not to produce a certain type of charging station for which it turns out that there is a demand, or into a situation where several types of charging stations are manufactured in amounts that are wasteful.

A further example of this challenge can be seen by a seller when deciding how to acquire or store a stock of charging stations to be sold later. The difficulties observed in this situation are similar to the ones seen by a manufacturer, as it is not possible for the seller to predict with confidence which types and the amounts that will be sold.

A known solution for this challenge involves providing one charging station for each possible combination of input electric signals. For example, in the case of the electrician, this involves carrying several charging stations to the electrical installation, and only when at the electrical installation's site using the one that is appropriate. This solution is simple but can be very expensive and cause a lot of logistical drawbacks, such as having too many charging stations in stock or having too many charging stations being transported between locations. Also, the electrician can make a mistake and connect a charging station that is not the right one for the electrical installation.

Another known solution is to provide a charging station that can operate with more than one combination of input electrical signals. However, it has been observed that known charging stations of this type are difficult to install. In some cases, the installation requires performing shunt connections between some of the input terminals of the charging station, and this can lead to dangerous situations in the case of a human error. In other situations, it has been observed that the charging stations are voluminous due to the number of electronic components included inside. In terms of volume, the typical difficulty is the presence of a high number of relays, which are components known to occupy a lot of space. Also, a higher number of electronic components makes the charging station more expensive.

SUMMARY OF THE INVENTION

It is an object of the invention to provide an arrangement for a charging unit for an electric vehicle, which allows charging of the electric vehicle for all types of electric grid, earthing systems, electric signals and any number of phases demanded by the electric vehicle. It is a further object of the invention to provide for an arrangement for a charging unit for an electric vehicle, which allows for phase balancing in a more efficient way.

The invention is defined by the independent claims. The dependent claims define advantageous embodiments.

In a first aspect the invention relates to an arrangement of electric components for controlling the delivery of electricity from an electrical grid (EG) to an electric vehicle (EV), the arrangement comprising:
- a first, a second, a third, and a fourth input terminals, each for receiving an electric signal from the EG;
- a first switching component for controlling a connection between a neutral output terminal connectable to the EV and the first input terminal;
- a second switching component for controlling a connection between the neutral output terminal connectable to the electrical vehicle and the second input terminal;
- a third switching component for controlling a connection between a first-phase output terminal connectable to the EV and the second input terminal;
- a fourth switching component for controlling a connection between the first-phase output terminal connectable to the EV and the third input terminal, and
- a fifth switching component for controlling a connection between the first-phase output terminal connectable to the EV and the fourth input terminal.

The effects of the features of the invention are as follows. The respective first, second, third and fourth input terminals may be conveniently coupled to the respective electric signal carrying cables from the electric grid. The two switching components that control the two connections between the neutral out terminal and the first and second input terminals provide for a flexibility as to what earthing configuration is used for the signals on the input terminals. In some configurations, such as TN-earthing systems, the first input terminal will carry a neutral signal, while the other input terminals carry the three respective phase signals. Yet in other configurations, there is no neutral signal, which means that the first, second and third input terminals will carry the phase signals. The earlier-mentioned two switching components allow for adaptation to both earthing systems, by simply controlling the setting of these two switching components, such that either the first or the second input terminal is coupled to the neutral out terminal. The impact of this feature is not to be underestimated. The invention gives full flexibility as regards the earthing system that is used in the location where the charging station(s) is/are installed. The three switching components that control the three connections between the first-phase output terminal and the second, third and further input terminal enable the earlier-mentioned phase balancing, i.e. the respective electrical vehicle may be charged using any one of these three phase signals on the second, third and fourth input terminal. This is achieved by simply controlling the setting of these three switching components, such that either the second, third or the fourth input terminal is coupled to the first-phase output terminal. This forms a one phase charging set-up. Further embodiments allow for multiphase charging and also allow for charging when using different earthing system and different power distributions, such as the split-phase type.

The arrangement may comprise:
- a further switching component for controlling a connection between a second-phase output terminal connectable to the EV and the third input terminal, and
- a further switching component for controlling a connection between a third-phase output terminal connectable to the EV and the fourth input terminal.

Also, the arrangement may comprise:
- a further switching component for controlling a connection between the neutral output terminal and the third input terminal;
- a further switching component for controlling a connection between the first-phase output terminal and the first input terminal; and
- three further switching components for controlling three connections between a second-phase output terminal connectable to the EV and the second, the third, and the fourth input terminals, respectively.

Moreover, the arrangement may comprise:
- a further switching component for controlling a connection between a third-phase output terminal connectable to the EV and the fourth input terminal.

According to another aspect of the invention, there is provided an arrangement of electric components for controlling the delivery of electricity from an EG to an EV, the arrangement comprising:

a first, a second, a third, and a fourth input terminals for receiving electric signals from the EG;

a first switching component for controlling a connection between a neutral output terminal connectable to the electrical vehicle and the first input terminal;

a second switching component for controlling a connection between the neutral output terminal connectable to the electrical vehicle and the second input terminal;

a third switching component for controlling a connection between the neutral output terminal connectable to the electrical vehicle and the third input terminal;

a fourth switching component for controlling a connection between a first-phase output terminal connectable to the electrical vehicle and the first input terminal;

a fifth switching component for controlling a connection between the first-phase output terminal connectable to the electrical vehicle and the second input terminal;

a sixth switching component for controlling a connection between the first-phase output terminal connectable to the electrical vehicle and the third input terminal;

a seventh switching component for controlling a connection between a second-phase output terminal connectable to the electrical vehicle and the second input terminal;

an eighth switching component for controlling a connection between the second-phase output terminal connectable to the electrical vehicle and the third input terminal, and a ninth switching component for controlling a connection between the second-phase output terminal connectable to the electrical vehicle and the fourth input terminal.

In any of the aspects above, the first, the second, and the third input terminals may be connectable to a Terra-Neutral earthing system, so that:

the first input terminal receives a neutral electrical signal;
the second input terminal receives a first-phase electrical signal; and
the third input terminal receives a second-phase electrical signal.

Also, the fourth input terminal may be connectable to the Terra-Neutral earthing system so that the fourth input terminal receives a third-phase electrical signal.

Moreover, in any of the aspects above, the first and the second input terminals may be connectable to any of an Isolated-Terra earthing system or a Terra-Terra earthing system, so that:

the first input terminal receives a first-phase electrical signal; and
the second input terminal receives a second-phase electrical signal.

Also, the third input terminal may be connectable to the any of an Isolated-Terra earthing system or a Terra-Terra earthing system, so that the third input terminal receives a third-phase electrical signal.

Moreover, in any of the aspects above, the first and the second input terminals may be connectable to a split-phase distribution system, so that:

the first input terminal receives a neutral electrical signal; and
the second input terminal receives one of the two line electrical signals of the split-phase distribution system.

The third input terminal may be connectable to the split-phase distribution system, so that the third input terminal receives the remaining line electrical signal of the split-phase distribution system.

The switching component may be a relay or a contactor. The switching component may also be of a solid-state type, such as a solid-state relay and any other solid-state device that is suitable for switching an electrical connection in a charging station.

In a second aspect the invention relates to a charging station for recharging an electric vehicle, the charging station comprising the arrangement as described in any of previous aspects.

In a third aspect the invention relates to an electric system connected to an electrical safety device that is connected to an electric grid, the electric system comprising a plurality of connectors for connecting the electrical safety device with a set of charging stations in accordance with claim 14, each connector carrying an electrical signal or ground in accordance with a predefined earthing system and electric power distribution type, wherein each charging station is connected to at least a subset of the plurality of the connectors via the arrangement in said charging station, and wherein each arrangement is further connectable to an electric vehicle. The electric system in accordance with a third aspect is typically what an electrician would build when installing a set of charging stations in a certain location.

BRIEF INTRODUCTION OF THE DRAWINGS

Embodiments of the invention will now be described, by way of example only, with reference to the accompanying drawings, in which:

FIGS. 3A and 3B are two schematic views of three arrangement embodiments for single-phase charging consuming electrical power from two different combinations of electrical signals, in which FIG. 3A shows the activations of switching components in a TN, 3 phases combination and FIG. 3B shows the activations in an IT/TT, 3 lines or a Split-phase 240V combinations;

FIGS. 6A and 6B are two schematic views of three arrangement embodiments for dual-phase charging consuming electrical power from two different combinations of electrical signals, in which FIG. 6A shows the activations of switching components for a TN, 3 phases combination and FIG. 6B shows the activations for an IT/TT, 3 lines or a Split-phase 240V combinations;

DETAILED DESCRIPTION OF THE EMBODIMENTS

Figure 1:
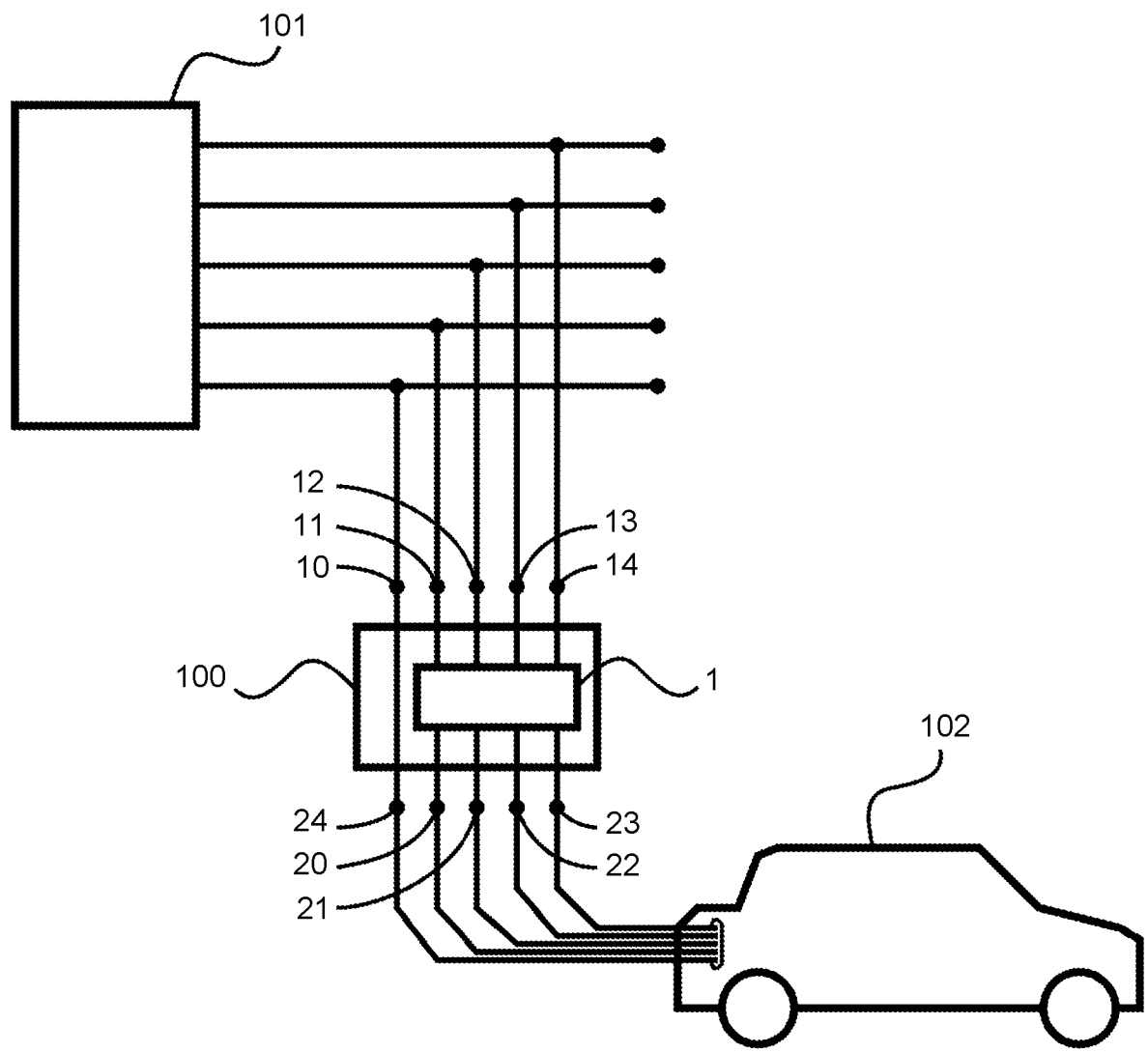
FIG. 1 is a schematic view of an electric vehicle being recharged by a charging station.

Turning now to FIG. 1, it shows an electric vehicle 102 being recharged.

The electric vehicle 102 (shown on the lower right corner of FIG. 1) is supplied with electrical power from a charging station 100 including five output terminals: a ground/protective earth output terminal 24; a neutral output terminal 20; a first-phase output terminal 21; a second-phase output terminal 22; and a third-phase output terminal 23. In practice, the connection between the electric vehicle 102 and the charging station 100 is typically implemented using a multi-conductor cable including a standard connector on each end, such as the Type 1/SAE J1772 or the Type 2 connectors established in the international standards IEC 62196. Moreover, conductors for transmitting signalling data may also be provided in the connection between the electric vehicle 102 and the charging station 100. These signalling conductors can be used by the charging station 100 to indicate to the electric vehicle 102 which electrical phases and how much current can be consumed.

The charging station 100 is part of an electrical installation for recharging electric vehicles, of which only a part of one group of charging stations is shown in FIG. 1. The electrical installation in this example is organised as follows: the electrical signals from an electrical grid (not shown) are distributed from a main electrical safety device (this may be the main fuse at a certain location that is fed by an electric network (not shown). The main electrical safety device is not shown to facilitate understanding the invention. From the main electrical safety device the electrical grid is distributed to an electrical safety device 101 (shown on the left-hand side of FIG. 1) of the group, and then to each of the charging stations within the group, including the charging station 100 (shown in FIG. 1) that is recharging the electric vehicle 102. The electric safety device 101 is typically a fuse circuit, which protects the respective groups against drawing excessive current levels (typically limited to 10 A, 16 A, 25 A, or 32 A) from the electric grid.

The charging station 100 receives electrical signals at its input terminals that are distributed by the electrical safety device 101 to the charging stations in the group. The input terminals of the charging station 100 are: a ground/protective earth input terminal 10, a first input terminal 11, a second input terminal 12, a third input terminal 13, and a fourth input terminal 14. The electrical signals transmitted to the charging station 100 depend on the electrical signals that the electrical installation receives from the electrical grid. Table 1 shows a number of possible combinations for the electrical signals.

TABLE 1

| Input terminals | ground/ protective earth input terminal 10 | first input terminal 11 | second input terminal 12 | third input terminal 13 | fourth input terminal 14 |
|---|---|---|---|---|---|
| TN, 3 phases | PE | N | L1 | L2 | L3 |
| TN, 2 phases | PE | N | L1 | L2 | — |
| TN, 1 phase | PE | N | L1 | — | — |
| IT/TT, 3 lines | PE | L1 | L2 | L3 | — |
| IT/TT, 2 lines | PE | L1 | L2 | — | — |
| Split-phase 240 V | G | W | X | Y | — |
| Split-phase 120 V | G | W | X or Y | — | — |

Electrical signals in Table 1:
PE: protective earth
G: ground
N, W: neutral
L1, L2, L3: line 1, line 2, line 3 (sometimes, referred to by the ordinal number of its electrical phase: first-phase, second-phase, third-phase)
X, Y: AC Line The internal structure of the charging station 100 is shown in a simplified manner in FIG. 1. For example, a direct connection is shown between the ground/protective earth input terminal 10 and the ground/protective earth output terminal 24, but in many cases the ground/protective earth input terminal 10 is also connected to other parts of the charging station 100 for safety purposes. The charging station 100 includes an arrangement 1 of electric components for controlling how the electricity from the first, second, third and fourth input terminals 11, 12, 13, 14 is delivered to the neutral, first-phase, second-phase, and third-phase output terminals 20, 21, 22, 23. The representation of the arrangement 1 inside the charging station 100 is also simplified, as several other components may exist between the arrangement 1 and the input terminals 11, 12, 13, 14 as well as between the arrangement 1 and the output terminals 20, 21, 22, 23.

The purpose of the arrangement 1 is to provide a phase selection feature for the charging station 1. For example, in single phase charging, the arrangement 1 can be instructed to select a certain electrical phase and then it connects the appropriate pair of input terminals to the neutral 20 and first-phase 21 output terminals.

Figure 2:
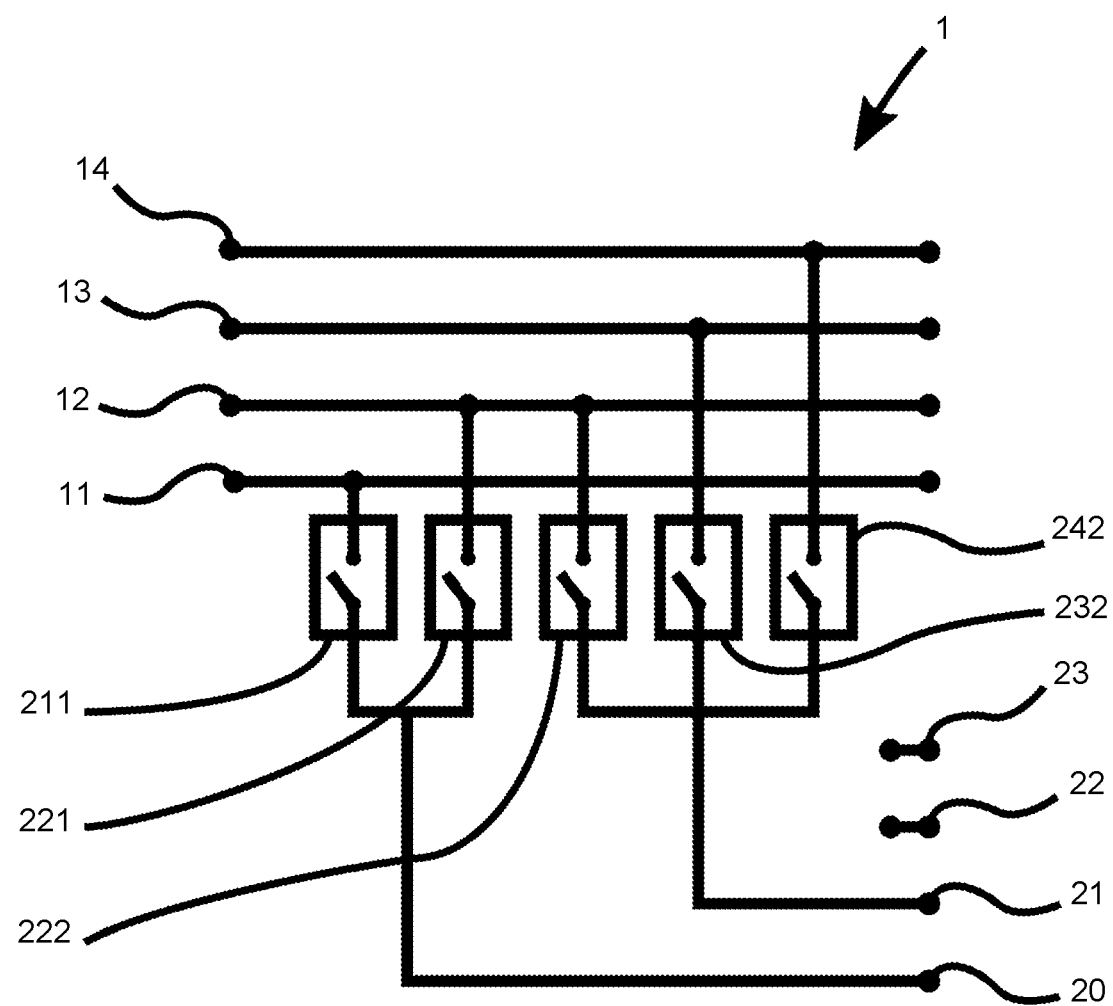
FIG. 2 is a schematic view of an embodiment of an arrangement of electric components for single-phase charging of the electric vehicle in FIG. 1.

FIG. 2 shows an embodiment of the arrangement 1 of electric components.

The arrangement 1 includes a first 11, a second 12, a third 13, and a fourth 14 input terminals for receiving electrical signals, two switching components 211, 221 for controlling which of the input electrical signals is transmitted to a neutral output terminal 20, and three switching components 222, 232, 242 for controlling which of the input electrical signals is transmitted to a first-phase output terminal 21. The arrangement 1 also includes two output terminals 22, 23 that are not being used.

In total, the arrangement 1 includes five switching components. The latter can be implemented with relays, contactors, or any other electric component that allows switching an electrical connection. The two switching components 211, 221 connected to the neutral output terminal 20 allow connecting the latter with the first 11 and the second 12 input terminals. Also, the three switching components 211, 221 connected to the first-phase output terminal 20 allow connecting the latter with the second 12, the third 13, and the fourth 14 input terminals (the connections between input terminals and switching components can be observed in the upper part of FIG. 2).

The low number of switching components, such as relays and contactors, achieves a lower heat loss. Moreover, since only a few switching components are used, the physical paths in the internal electronic circuit of the arrangement 1 are also shorter, which results in lower heat losses as well. Thus, a low amount of heat is generated, and the arrangement 1 can be implemented without requiring any fan or similar cooling devices.

For any of the combinations of electrical signals shown in Table 1, the arrangement 1 can select one of the electrical phases at the input terminals 11, 12, 13, 14 to be transmitted between the neutral output terminal 20 and the first-phase output terminal 21. The arrangement 1 is thus very adaptable for single-phase charging.

Figure 3A:
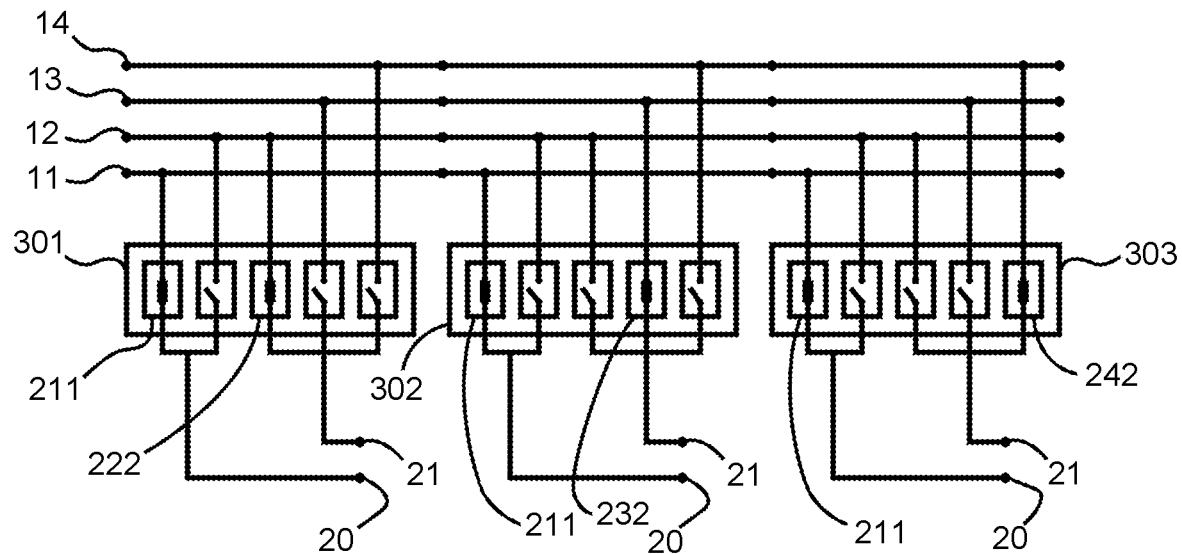
Figure 3B:
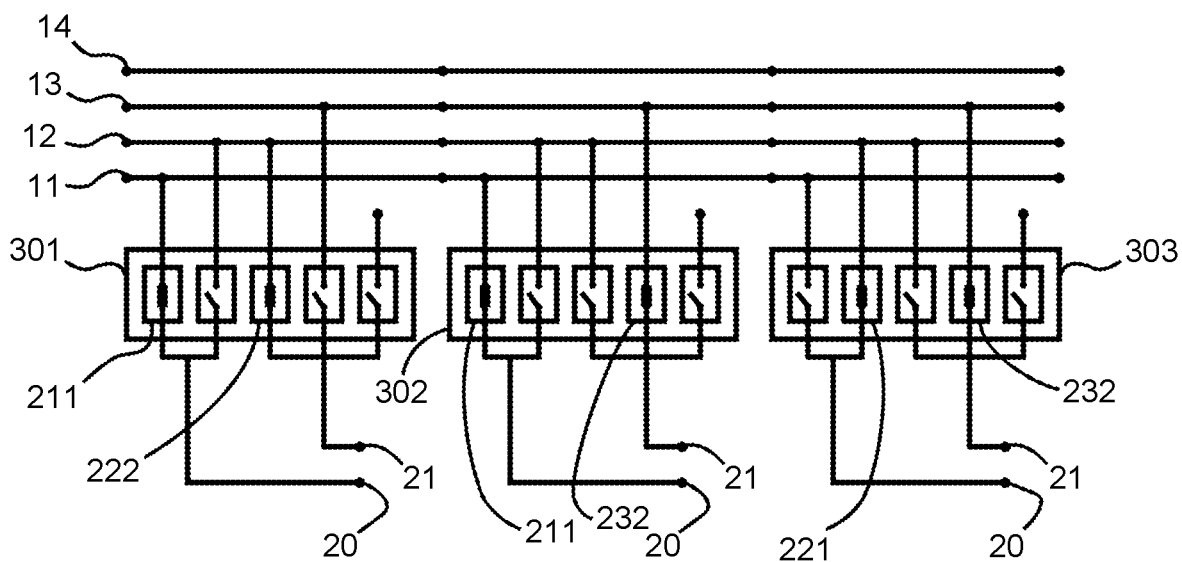

FIGS. 3A and 3B both show three instances of the arrangement 1 embodiment in FIG. 2, each arrangement 301, 302, 303 being part of a different charging station and each transmitting a different electrical phase to the output terminals of the respective charging station. The switching components that are activated are shown in the two figures with a direct line in their interior.

The main difference between the two figures is the combination of input electrical signals: in FIG. 3A, the TN, 3 phases combination (see Table 1) is used; and in FIG. 3B either the IT/TT, 3 lines or the Split-phase 240V combination (see Table 1) is used.

In FIG. 3A, the three arrangements 301, 302, 303 are all establishing the following connection: the first input terminal 11, which is receiving a neutral electrical signal, is connected by a switching component 211 to the neutral output terminal 20. However, the connection established with the first-phase output terminal 21 varies along the arrangements 301, 302, 303. In the first arrangement 301, in which the first electrical phase is selected, the second input terminal 12 is receiving a first-phase electrical signal, and it is connected by a switching component 222 to the first-phase output terminal 21. In the second arrangement 302, in which the second electrical phase is selected, the third input terminal 13 is receiving a second-phase electrical signal, and it is connected by a switching component 232 to the first-phase output terminal 21. And in the third arrangement 303, in which the third electrical phase is selected, the fourth input terminal 14 is receiving a third-phase electrical signal, and it is connected by a switching component 242 to the first-phase output terminal 21.

The chosen activations of the switching components 211, 221, 222, 232, 242 for achieving the connections in FIG. 3A are suitable for a TN, 3 phases combination (see Table 1). However, this choice of switching components would not work in an IT/TT, 3 lines or a Split-phase 240V combination because the input electrical signals are different. In these latter two cases, the fourth input terminal 14 is not supplied with any electrical signal. Thus, different activations of the switching components in the arrangement 1 need to be chosen.

In FIG. 3B, each of the arrangements 301, 302, 303 has one switching component that is not connected to any input terminal (i.e. the one on the right end of each arrangement). This representation serves only to illustrate that this switching component is not used, however it could be connected to the fourth input terminal 14, and this would not be problematic because this switching component is not activated in the IT/TT, 3 lines or the Split-phase 240V combinations.

The first two arrangements 301, 302 are both establishing the following connection: the first input terminal 11, which is receiving a line 1 signal, is connected by a switching component 211 to the neutral output terminal 20. However, the connection established with the first-phase output terminal 21 varies along the two arrangements 301, 302. In the first arrangement 301, in which a first electrical phase is selected, the second input terminal 12 is receiving a line 2 electrical signal, and it is connected by a switching component 222 to the first-phase output terminal 21. In the second arrangement 302, in which a second electrical phase is selected, the third input terminal 13 is receiving a line 3 electrical signal, and it is connected by a switching component 232 to the first-phase output terminal 21. Moreover, in the third arrangement 303, in which a third electrical phase is selected, the following connections are established: the second input terminal 11, which is receiving the line 2 electrical signal, is connected by a switching component 221 to the neutral output terminal 20, and the third input terminal 13, which is receiving the line 3 electrical signal, is connected by a switching component 232 to the first-phase output terminal 21.

Therefore, the arrangement 1 in FIG. 2, including five switching components 211, 221, 222, 232, 242 can select each of the input electrical phases for single phase charging, in any of the following combinations of input electrical signals (see Table 1): TN, 3 phases; IT/TT, 3 lines; and Split-phase 240V. Moreover, the selection of any of the two electrical phases supplied in a TN, 2 phases combination (see Table 1) is also possible with the arrangement 1 shown in FIG. 2, for example by activating the switching components as shown for the first two arrangements 301, 302 in FIGS. 3A and 3B. Furthermore, the arrangement 1 is also compatible with the following single-phase combinations (see Table 1): TN, 1 phase; IT/TT, 2 lines; and Split-phase 120V.

Figure 4:
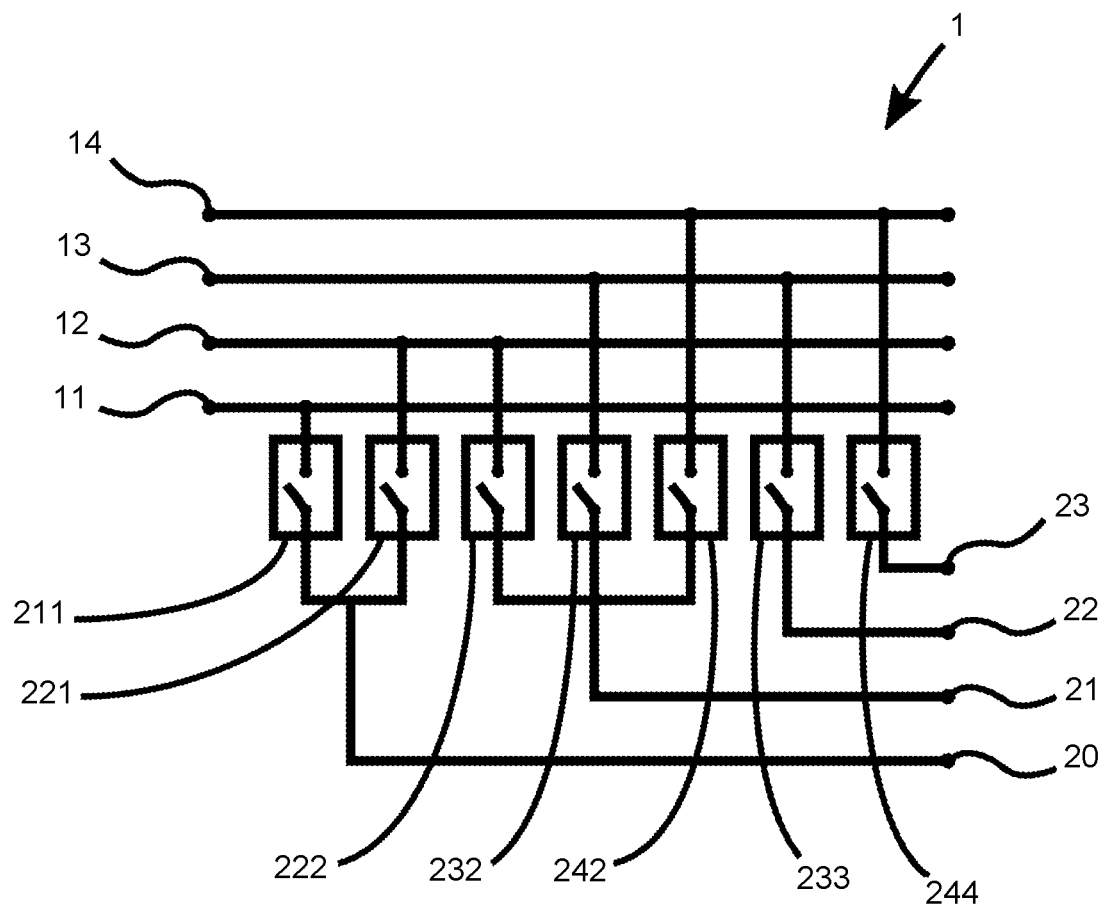
FIG. 4 is a schematic view of an embodiment of an arrangement of electric components for single- or three-phase charging of the electric vehicle in FIG. 1.

FIG. 4 shows an arrangement 1 embodiment similar to the one shown in FIG. 2, additionally including two switching components 233, 244 for connecting the third 13 and fourth 14 input terminals to the second 22 and third 23 phase output terminals, respectively.

The arrangement 1 includes seven switching components 211, 221, 222, 232, 242, 233, 244, in total, and can achieve the adaptability in the selection of the electrical phase for single-phase charging, as explained above for FIGS. 2, 3A and 3B, as well as achieve a selection of electrical phases for three-phase charging.

The arrangement 1 can also achieve dual-phase charging, but only for phase selections and combinations of input signals (see Table 1) in which the second-phase output terminal 22 is to be connected with the third input terminal 13 by a switching component 233.

In practice, it has been observed that the arrangement 1 in FIG. 4 also achieves a low heat generation, and the arrangement 1 can be implemented without requiring any fan or similar cooling devices.

Figure 5:
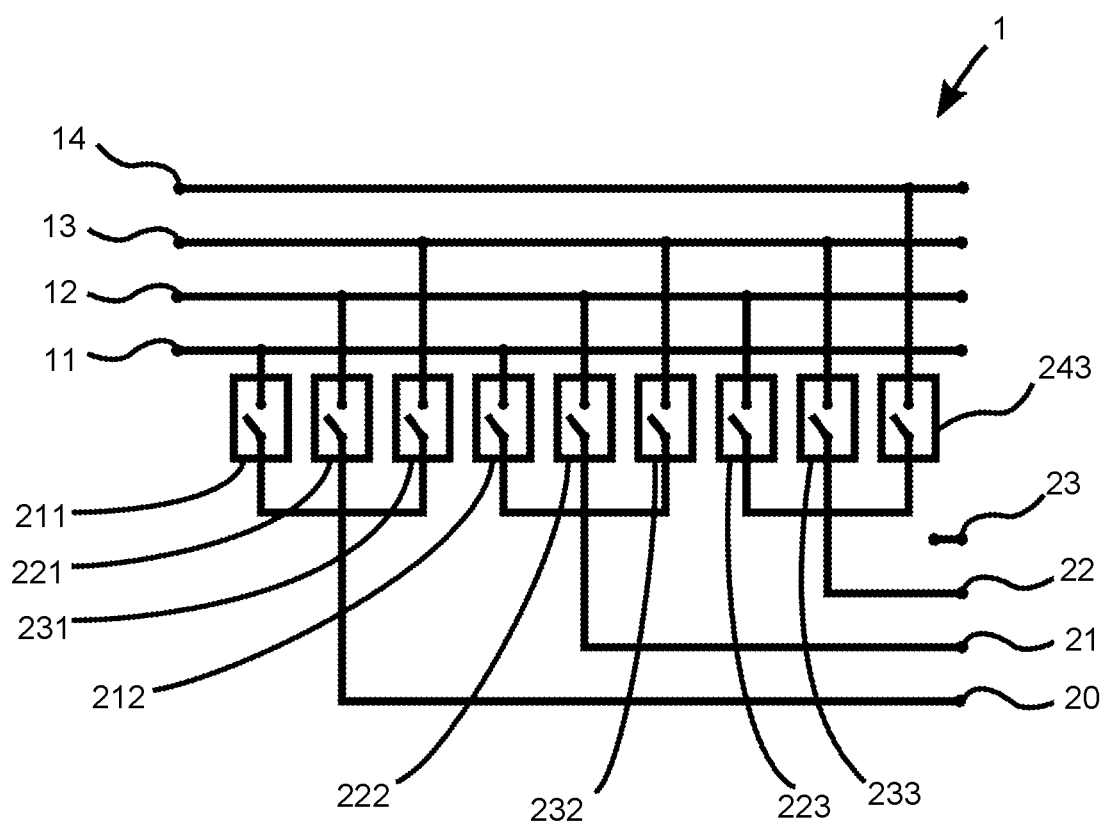
FIG. 5 is a schematic view of an embodiment of an arrangement of electric components for dual-phase charging of the electric vehicle in FIG. 1.

FIG. 5 shows an arrangement 1 of electric components for dual-phase charging of the electric vehicle 102 in FIG. 1.

In dual-phase charging, the electric vehicle 102 consumes two electrical phases: one is consumed between the neutral output terminal 20 and the first-phase output terminal 21; the other is consumed between the neutral output terminal 20 and the second-phase output terminal 22.

The arrangement 1 includes three switching components 211, 221, 231 for controlling which of the input electrical signals is transmitted to the neutral output terminal 20, three switching components 212, 222, 232 for controlling which of the input electrical signals is transmitted to the first-phase output terminal 21, and three switching components 223, 233, 243 for controlling which of the input electrical signals is transmitted to the second-phase output terminal 22. The arrangement 1 also includes a third-phase output terminal 23 that is not being used.

In total, the arrangement 1 includes nine switching components. The three switching components 211, 221, 231 connected to the neutral output terminal 20 allow connecting the latter with the first 11, the second 12, and the third 13 input terminals. Also, the three switching components 212, 222, 232 connected to the first-phase output terminal 21 allow connecting the latter with the first 11, the second 12, and the third 13 input terminals. Moreover, the three switching components 223, 233, 243 connected to the second-phase output terminal 22 allow connecting the latter with the second 12, the third 13, and the fourth 14 input terminals (the connections between input terminals and switching components can be observed in the upper part of FIG. 5).

For any of the combinations of electrical signals shown in Table 1 that include at least two electrical phases, the arrangement 1 can select two electrical phases at the input terminals 11, 12, 13, 14 to be transmitted between the neutral output terminal 20 and the first-phase output terminal 21, and between the neutral output terminal 20 and the second-phase output terminal 22. The arrangement 1 is thus very adaptable for dual-phase charging.

Figure 6A:
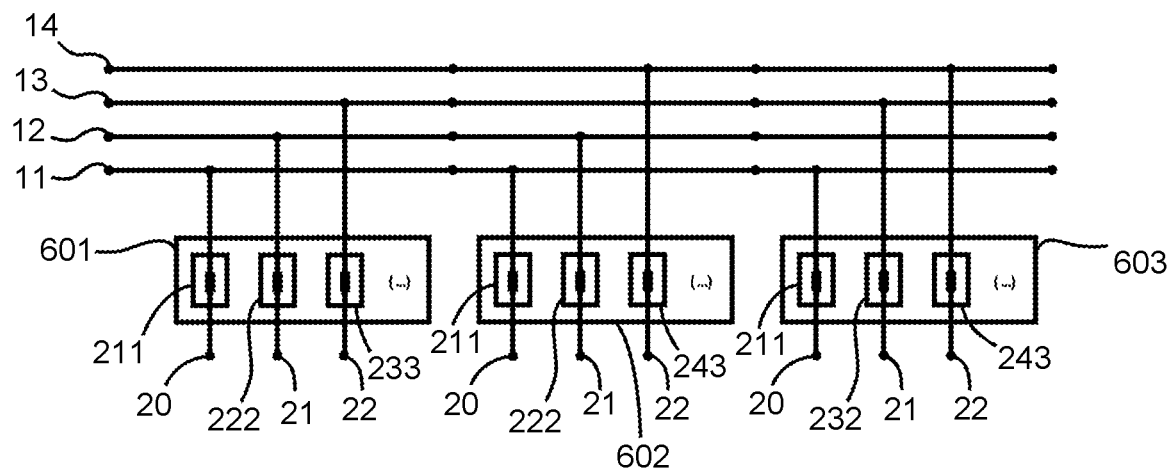
Figure 6B:
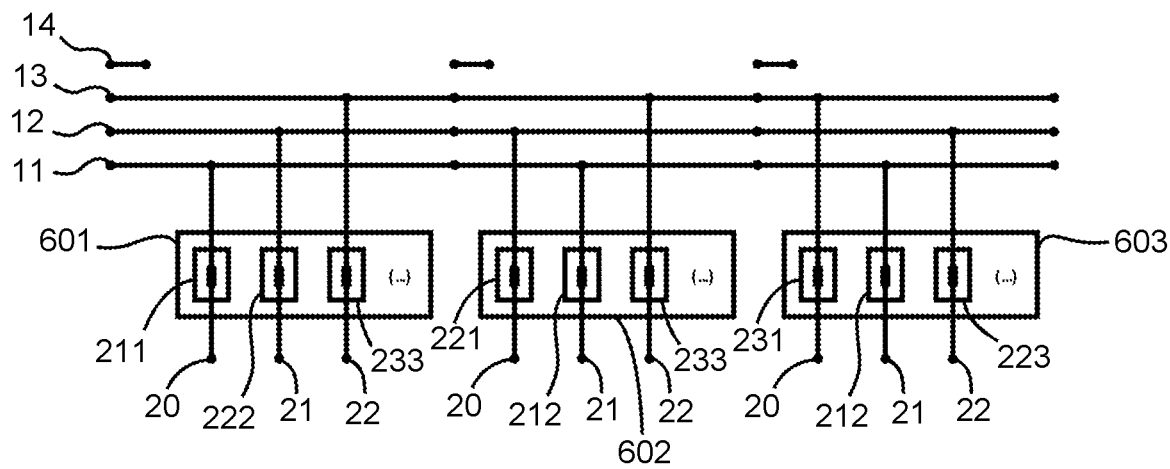

FIGS. 6A and 6B follow a similar illustration to the one shown in FIGS. 3A and 3B for the arrangement 1 in FIG. 2. That is, three instances of the arrangement 1 embodiment in FIG. 5 are shown, each arrangement 601, 602, 603 being part of a different charging station and each transmitting a different pair of electrical phases to the output terminals of the respective charging station. The switching components that are activated are shown in the two figures with a direct line in their interior.

In order to simplify the drawings, FIGS. 6A and 6B only show the switching components that are activated in each arrangement.

Also, the main difference between the two figures is the combination of input electrical signals: in FIG. 6A, the TN, 3 phases combination (see Table 1) is used; and in FIG. 6B either the IT/TT, 3 lines or the Split-phase 240V combination (see Table 1) is used.

In FIG. 6A, the three arrangements 601, 602, 603 are all establishing the following connection: the first input terminal 11, which is receiving a neutral electrical signal, is connected by a switching component 211 to the neutral output terminal 20. However, the connections established with the first-phase output terminal 21 and the second-phase output terminal 22 varies along the arrangements 601, 602, 603.

The connections of switching components and the input terminals can be observed in the upper half of FIG. 6A as follows.

In the first arrangement 601, in which the first and second electrical phases are selected, the second input terminal 12 is receiving a first-phase electrical signal, and it is connected by a switching component 222 to the first-phase output terminal 21, and the third input terminal 13 is receiving a second-phase electrical signal, and it is connected by a switching component 233 to the second-phase output terminal 22.

In the second arrangement 602, in which the first and third electrical phases are selected, the second input terminal 12 is also receiving the first-phase electrical signal, and it is connected by a switching component 222 to the first-phase output terminal 21, but the fourth input terminal 14 is receiving a third-phase electrical signal, and it is connected by a switching component 243 to the second-phase output terminal 22.

And in the third arrangement 603, in which the second and third electrical phases are selected, the third input terminal 13 is receiving a second-phase electrical signal, and it is connected by a switching component 232 to the first-phase output terminal 21, and the fourth input terminal 14 is receiving the third-phase electrical signal, and it is connected by a switching component 243 to the second-phase output terminal 22.

The chosen activations of the switching components 211, 221, 231, 212, 222, 232, 223, 233, 243 for achieving the connections in FIG. 6A are suitable for a TN, 3 phases combination (see Table 1). However, this choice of switching components would not work in an IT/TT, 3 lines or a Split-phase 240V combination because the input electrical signals are different. In these latter two cases, the fourth input terminal 14 is not supplied with any electrical signal. Thus, different activations of the switching components in the arrangement 1 need to be chosen.

The connections of switching components and the input terminals can be observed in the upper half of FIG. 6B as follows.

In the first arrangement 601, in which a first and a second electrical phases are selected, the first input terminal 11 is receiving a line 1 electrical signal, and it is connected by a switching component 211 to the neutral output terminal 20; the second input terminal 12 is receiving a line 2 electrical signal, and it is connected by a switching component 222 to the first-phase output terminal 21; and the third input terminal 13 is receiving a line 3 electrical signal, and it is connected by a switching component 233 to the second-phase output terminal 22.

In the second arrangement 602, in which the first and a third electrical phases are selected, the second input terminal 12 receiving the line 2 electrical signal is connected by a switching component 221 to the neutral output terminal 20; the first input terminal 11 receiving the line 1 electrical signal is connected by a switching component 212 to the first-phase output terminal 21; and the third input terminal 13 is receiving the line 3 electrical signal is connected by a switching component 233 to the second-phase output terminal 22.

And in the third arrangement 603, in which the second and the third electrical phases are selected, the third input terminal 13 receiving the line 3 electrical signal is connected by a switching component 231 to the neutral output terminal 20; the first input terminal 11 receiving the line 1 electrical signal is connected by a switching component 212 to the first-phase output terminal 21; and the second input terminal 12 receiving the line 2 electrical signal is connected by a switching component 223 to the second-phase output terminal 22.

Therefore, the arrangement 1 in FIG. 5, including nine switching components 211, 221, 231, 212, 222, 232, 223, 233, 243 can select pairs of electrical phases for dual-phase charging, in any of the following combinations of input electrical signals (see Table 1): TN, 3 phases; IT/TT, 3 lines; and Split-phase 240V.

Figure 7:
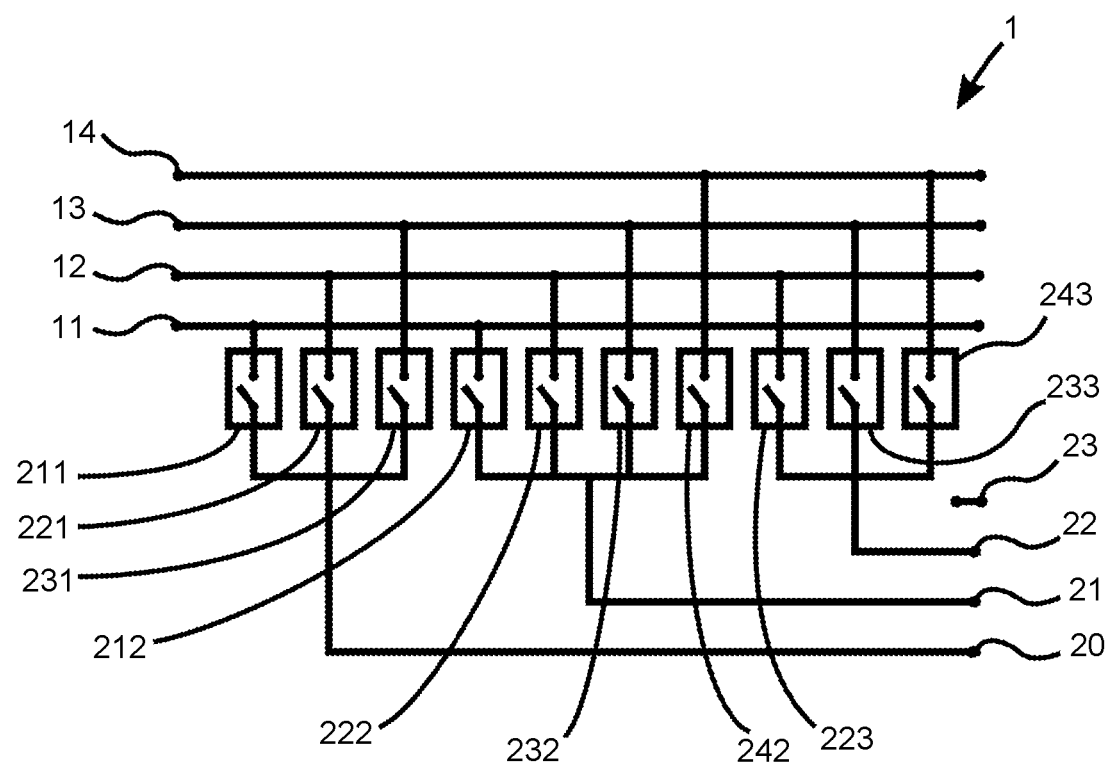
FIG. 7 is a schematic view of an embodiment of an arrangement of electric components for single- or dual-phase charging of the electric vehicle in FIG. 1.

FIG. 7 shows an arrangement 1 embodiment combining the embodiments shown in FIG. 2 and FIG. 5. The arrangement 1 allows single- or dual-phase charging of the electric vehicle in FIG. 1.

In contrast to FIG. 5, the arrangement 1 includes an additional switching component 242 for connecting the fourth input terminal 14 to the first-phase output terminal 21. Thus, the arrangement 1 has a total of ten switching components 211, 221, 231, 212, 222, 232, 242, 223, 233, 243.

Figure 8:
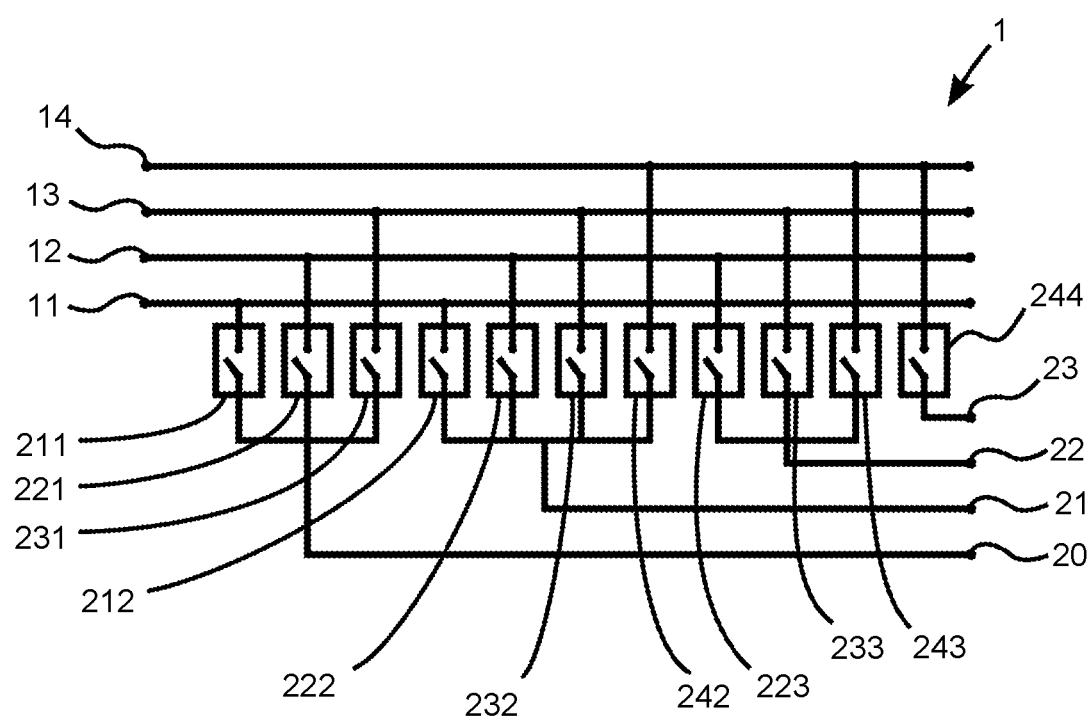
FIG. 8 is a schematic view of an embodiment of an arrangement of electric components for single-, dual- or three-phase charging of the electric vehicle in FIG. 1.

FIG. 8 shows an arrangement 1 embodiment combining the embodiments shown in FIG. 4 and FIG. 5. The arrangement 1 allows single-, dual- or three-phase charging of the electric vehicle in FIG. 1.

In contrast to FIG. 7, the arrangement 1 includes an additional switching component 244 for connecting the fourth input terminal 14 to the third-phase output terminal 23. Thus, the arrangement 1 has a total of eleven switching components 211, 221, 231, 212, 222, 232, 242, 223, 233, 243, 244.

Embodiments of the invention may have some or all of the following advantages:

Low number of switching components, such as relays or contactors;

Lower heat loss in the charging station and lack of need for cooling devices, such as fans;

Allows solving the challenge of providing a charging station for electric vehicles that allows phase selection, without knowing in advance which combination of input electrical signals will be available to the charging station, and Smaller charging station and cheaper to produce There are several ways of implementing a control system for instructing a group of charging stations about the choice of electrical phase in each one.

The invention is further defined by the following items.

Item 1. An arrangement 1 of electric components for controlling the delivery of electricity from an electrical grid to an electric vehicle 102, the arrangement comprising:
- a first, a second, a third, and a fourth input terminals 11, 12, 13, 14, each for receiving an electric signal from the electrical grid;
- two switching components 211, 221 for controlling two connections between a neutral output terminal 20 connectable to the electrical vehicle 102 and the first and the second input terminals 11, 12; and
- three switching components 222, 232, 242 for controlling three connections between a first-phase output terminal 21 connectable to the electrical vehicle 102 and the second, the third, and the fourth input terminals 12, 13, 14.

Item 2. Arrangement 1 according to item 1, comprising:
- a switching component 233 for controlling a connection between a second-phase output terminal 22 connectable to the electrical vehicle 102 and the third input terminal 13, and
- a switching component 244 for controlling a connection between a third-phase output terminal 23 connectable to the electrical vehicle 102 and the fourth input terminal 14.

Item 3. Arrangement 1 according to item 1, comprising:
- a switching component 231 for controlling a connection between the neutral output terminal 20 and the third input terminal 13;
- a switching component 212 for controlling a connection between the first-phase output terminal 21 and the first input terminal 11; and
- three switching components 223, 233, 243 for controlling three connections between a second-phase output terminal 22 connectable to the electrical vehicle 102 and the second, the third, and the fourth input terminals 12, 13, 14.

Item 4. Arrangement 1 according to item 3, comprising:
- a switching component for controlling a connection between a third-phase output terminal connectable to the electrical vehicle 102 and the fourth input terminal.

Item 5. An arrangement 1 of electric components for controlling the delivery of electricity from an electrical grid to an electric vehicle 102, the arrangement comprising:
- a first, a second, a third, and a fourth input terminals 11, 12, 13, 14 for receiving electric signals from the electrical grid;
- three switching components 211, 221, 231 for controlling three connections between a neutral output terminal 20 connectable to the electrical vehicle 102 and the first, the second, and the third input terminals 11, 12, 13;
- three switching components 212, 222, 232 for controlling three connections between a first-phase output terminal 21 connectable to the electrical vehicle 102 and the first, the second, and the third input terminals 11, 12, 13; and
- three switching components 223, 233, 243 for controlling three connections between a second-phase output terminal 22 connectable to the electrical vehicle 102 and the second, the third, and the fourth input terminals 12, 13, 14.

Item 6. Arrangement 1 according to any of the preceding items, wherein the first, the second, and the third input terminals 11, 12, 13 are connectable to a Terra-Neutral earthing system, so that:
- the first input terminal 11 receives a neutral electrical signal;
- the second input terminal 12 receives a first-phase electrical signal; and
- the third input terminal 13 receives a second-phase electrical signal.

Item 7. Arrangement 1 according to item 6, wherein the fourth input terminal 14 is connectable to the Terra-Neutral earthing system so that the fourth input terminal 14 receives a third-phase electrical signal.

Item 8. Arrangement 1 according to any of the items 1 to 5, wherein the first and the second input terminals 11, 12 are connectable to any of an Isolated-Terra earthing system or a Terra-Terra earthing system, so that:
- the first input terminal 11 receives a first-phase electrical signal; and
- the second input terminal 12 receives a second-phase electrical signal.

Item 9. Arrangement 1 according to item 8, wherein the third input terminal 13 is connectable to the any of an Isolated-Terra earthing system or a Terra-Terra earthing system, so that the third input terminal 13 receives a third-phase electrical signal.

Item 10. Arrangement 1 according to any of the items 1 to 5, wherein the first and the second input terminals 11, 12 are connectable to a split-phase distribution system, so that:
- the first input terminal 11 receives a neutral electrical signal; and
- the second input terminal 12 receives one of the two line electrical signals of the split-phase distribution system.

Item 11. Arrangement 1 according to item 10, wherein the third input terminal 13 is connectable to the split-phase distribution system, so that the third input terminal 13 receives the remaining line electrical signal of the split-phase distribution system.

Item 12. Arrangement 1 according to any of the preceding items, wherein a switching component is a relay.

Item 13. Arrangement 1 according to item 12, wherein the relay is a contactor.

Item 14. A charging station 100 for recharging an electric vehicle 102, the charging station 100 comprising an arrangement 1 of electric components as described in any of the preceding items.

Generally, the terms used in this description and claims are interpreted according to their ordinary meaning in the technical field, unless explicitly defined otherwise. Notwithstanding, the terms "comprises" and "comprising" and variations thereof mean that the specified features, steps or integers are included. These terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the embodiments described above, many equivalent modifications and variations will be apparent to those skilled in the art when given this disclosure. Accordingly, the embodiments of the invention set forth above are considered to be illustrative and not limiting. Various changes to the described embodiments may be made without departing from the scope of the invention.

The invention claimed is:

1. An arrangement of electric components for controlling the delivery of electricity from an electrical grid to an electric vehicle, the arrangement comprising:
 a first, a second, a third, and a fourth input terminals, each for receiving an electric signal from the electrical grid;
 a first switching component for controlling a connection between a neutral output terminal connectable to the electrical vehicle and the first input terminal;
 a second switching component for controlling a connection between the neutral output terminal connectable to the electrical vehicle and the second input terminal;
 a third switching component for controlling a connection between a first-phase output terminal connectable to the electrical vehicle and the second input terminal;
 a fourth switching component for controlling a connection between athe first-phase output terminal connectable to the electrical vehicle and the third input terminal, and
 a fifth switching component for controlling a connection between the first-phase output terminal connectable to the electrical vehicle and the fourth input terminal.

2. The arrangement according to claim 1, comprising:
 a further switching component for controlling a connection between a second-phase output terminal connectable to the electrical vehicle and the third input terminal, and
 a further switching component for controlling a connection between a third-phase output terminal connectable to the electrical vehicle and the fourth input terminal.

3. The arrangement according to claim 1, comprising:
 a further switching component for controlling a connection between the neutral output terminal and the third input terminal;
 a further switching component for controlling a connection between the first-phase output terminal and the first input terminal; and
 three further switching components for controlling connections between a second-phase output terminal connectable to the electrical vehicle and the second, the third, and the fourth input terminals, respectively.

4. The arrangement according to claim 3, comprising:
 a further switching component for controlling a connection between a third-phase output terminal connectable to the electrical vehicle and the fourth input terminal.

5. An arrangement of electric components for controlling the delivery of electricity from an electrical grid to an electric vehicle, the arrangement comprising:
 a first, a second, a third, and a fourth input terminals for receiving electric signals from the electrical grid;
 a first switching component for controlling a connection between a neutral output terminal connectable to the electrical vehicle and the first input terminal;
 a second switching component for controlling a connection between athe neutral output terminal connectable to the electrical vehicle and the second input terminal;
 a third switching component for controlling a connection between the neutral output terminal connectable to the electrical vehicle and the third input terminal;
 a fourth switching component for controlling a connection between a first-phase output terminal connectable to the electrical vehicle and the first input terminal;
 a fifth switching component for controlling a connection between athe first-phase output terminal connectable to the electrical vehicle and the second input terminal;
 a sixth switching component for controlling a connection between athe first-phase output terminal connectable to the electrical vehicle and the third input terminal;
 a seventh switching component for controlling a connection between a second-phase output terminal connectable to the electrical vehicle and the second input terminal;
 an eighth switching component for controlling a connection between athe second-phase output terminal connectable to the electrical vehicle and the third input terminal, and
 a ninth switching component for controlling a connection between the second-phase output terminal connectable to the electrical vehicle and the fourth input terminal.

6. The arrangement according to claim 1, wherein the first, the second, and the third input terminals are connectable to a Terra-Neutral earthing system, so that:
 the first input terminal receives a neutral electrical signal;
 the second input terminal receives a first-phase electrical signal; and
 the third input terminal receives a second-phase electrical signal.

7. The arrangement according to claim 6, wherein the fourth input terminal is connectable to the Terra-Neutral earthing system so that the fourth input terminal receives a third-phase electrical signal.

8. The arrangement according to claim 1, wherein the first and the second input terminals are connectable to any of an Isolated-Terra earthing system or a Terra-Terra earthing system, so that:
 the first input terminal receives a first-phase electrical signal; and
 the second input terminal receives a second-phase electrical signal.

9. The arrangement according to claim 8, wherein the third input terminal is connectable to any of an Isolated-Terra earthing system or a Terra-Terra earthing system, so that the third input terminal receives a third-phase electrical signal.

10. The arrangement according to claim 1, wherein the first and the second input terminals are connectable to a split-phase distribution system, so that:
 the first input terminal receives a neutral electrical signal; and
 the second input terminal receives one of the two line electrical signals of the split-phase distribution system.

11. The arrangement according to claim 10, wherein the third input terminal is connectable to the split-phase distribution system, so that the third input terminal receives the remaining line electrical signal of the split-phase distribution system.

12. The arrangement according to claim 1, wherein the switching components each comprise a relay.

13. The arrangement according to claim 12, wherein the relay is a contactor.

14. A charging station for recharging an electric vehicle, the charging station comprising an arrangement of electric components for controlling the delivery of electricity from an electrical grid to an electric vehicle, the arrangement comprising:
- a first, a second, a third, and a fourth input terminals, each for receiving an electric signal from the electrical grid;
- a first switching component for controlling a connection between a neutral output terminal connectable to the electrical vehicle and the first input terminal;
- a second switching component for controlling a connection between the neutral output terminal connectable to the electrical vehicle and the second input terminal;
- a third switching component for controlling a connection between a first-phase output terminal connectable to the electrical vehicle and the second input terminal;
- a fourth switching component for controlling a connection between the first-phase output terminal connectable to the electrical vehicle and the third input terminal, and
- a fifth switching component for controlling a connection between the first-phase output terminal connectable to the electrical vehicle and the fourth input terminal.

15. An electric system connected to an electrical safety device that is connected to an electric grid, the electric system comprising a plurality of connectors for connecting the electrical safety device with a set of charging stations in accordance with claim 14, each connector carrying an electrical signal or ground in accordance with a predefined earthing system and electric power distribution type, wherein each charging station is connected to at least a subset of the plurality of the connectors via the arrangement in said charging station, and wherein each arrangement is further connectable to an electric vehicle.

* * * * *